United States Patent [19]

Gaither

[11] Patent Number: 4,991,431
[45] Date of Patent: Feb. 12, 1991

[54] METHOD OF MONITORING A MOUNT SYSTEM FOR AN AIRCRAFT ENGINE

[75] Inventor: Charles W. Gaither, Nineveh, Ind.

[73] Assignee: General Motors Corporation, Detroit, Mich.

[21] Appl. No.: 472,914

[22] Filed: Jan. 31, 1990

[51] Int. Cl.⁵ ............................................. G01M 15/00
[52] U.S. Cl. .................................................... 73/118.1
[58] Field of Search ................. 73/118.1, 865.8, 865.9, 73/786; 340/945, 963; 416/61; 248/542; 244/54

[56] References Cited

U.S. PATENT DOCUMENTS 3,135,487 6/1964 Kottsieper ............................... 248/5
3,288,404 11/1966 Schmidt et al. ......................... 248/5
3,764,098 10/1973 Dickinson ................................ 248/2

Primary Examiner—Robert Raevis
Attorney, Agent, or Firm—Saul Schwartz

[57] ABSTRACT

A method of monitoring a mount system for an aircraft propulsion turbo-prop engine including the steps of dynamically measuring the fraction of output shaft torque being reacted by a selected one of the mount elements of the mount system and comparing the dynamically measured fraction with a predetermined fraction for the selected mount element corresponding to normal operation of the mount system. Variation between dynamic fraction and the predetermined fraction indicates a change of load distribution between the mount elements of the mount system.

4 Claims, 2 Drawing Sheets

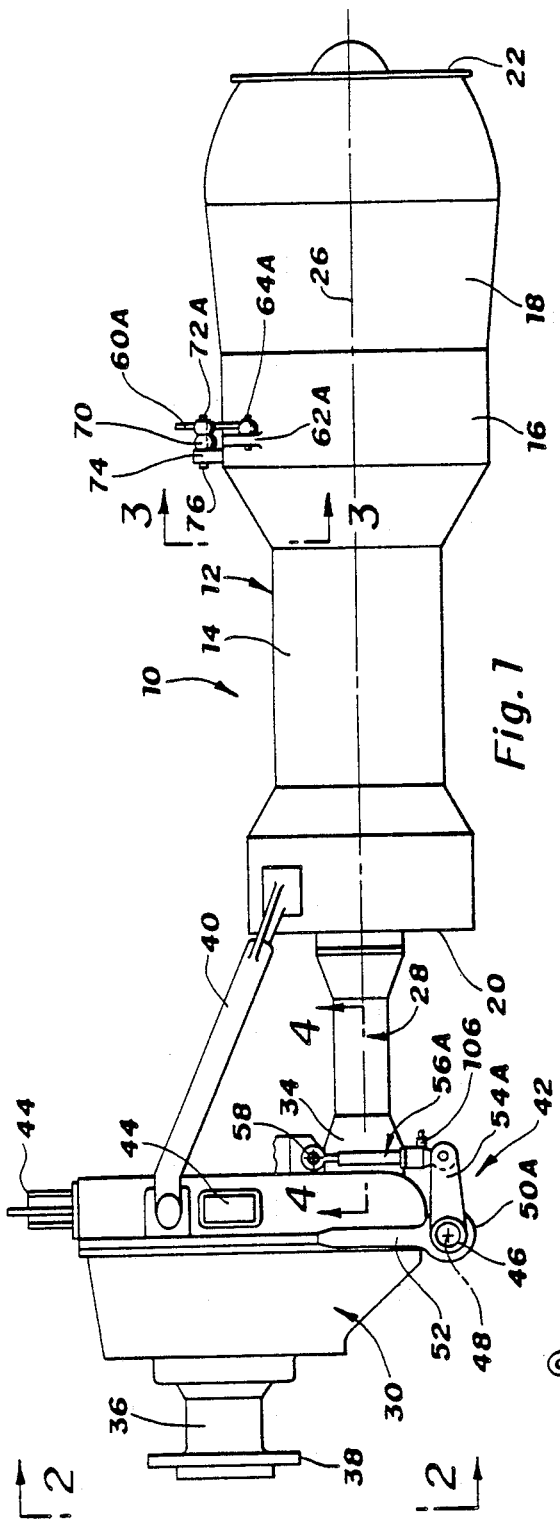
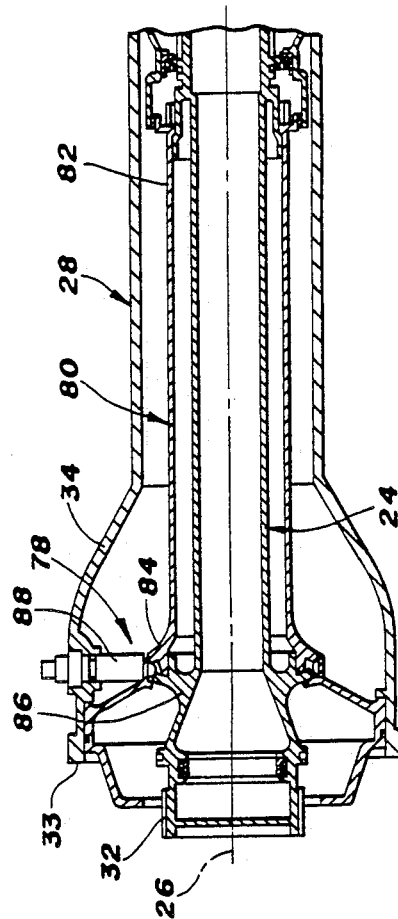
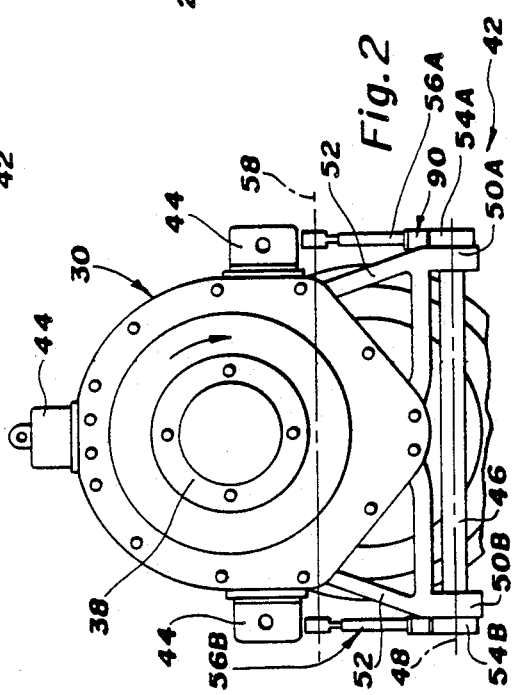

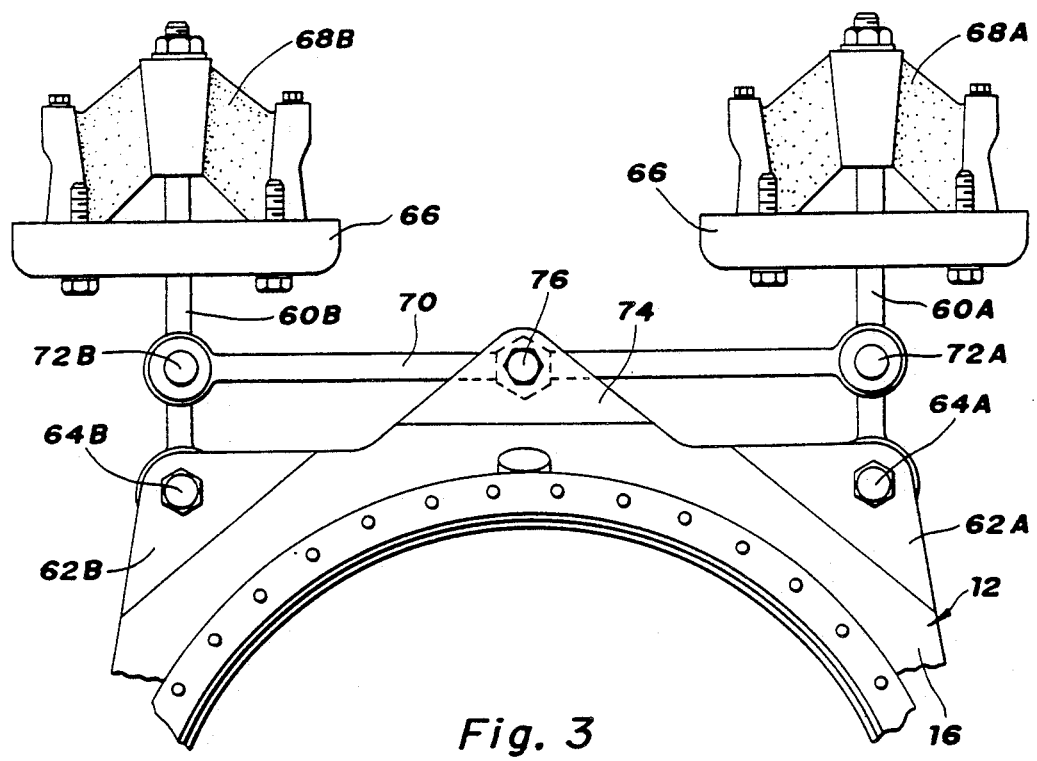
Fig. 3
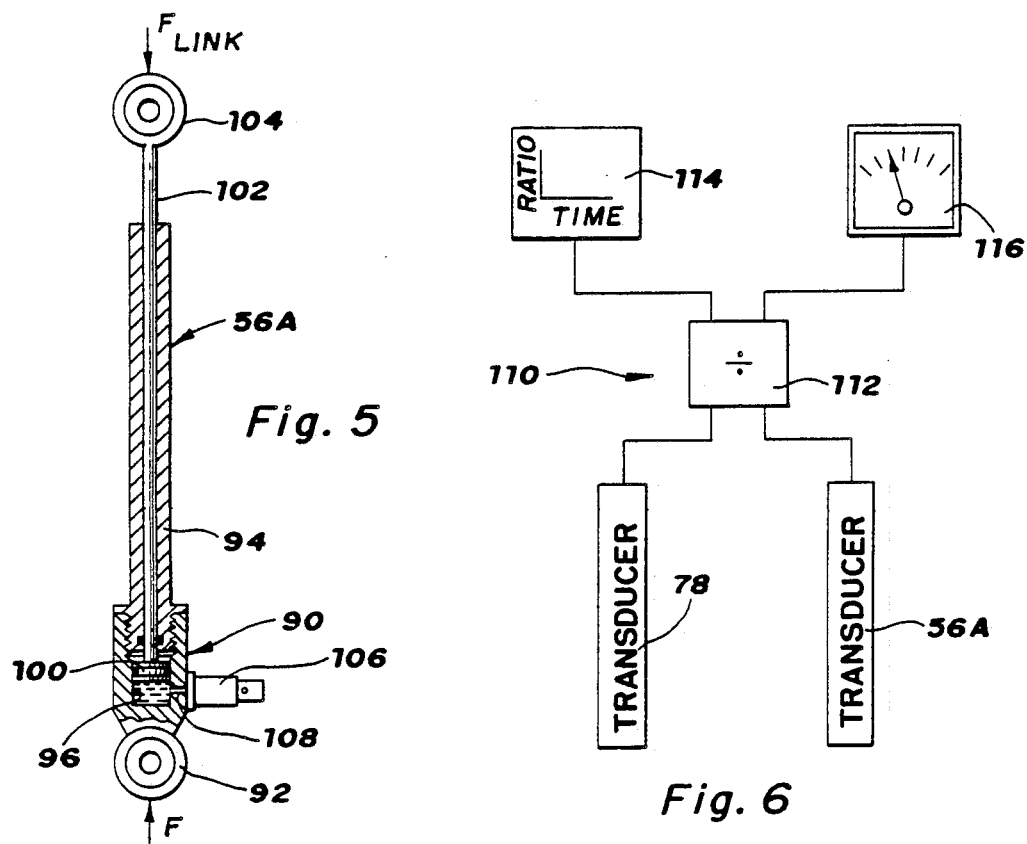
Fig. 5
Fig. 6

METHOD OF MONITORING A MOUNT SYSTEM FOR AN AIRCRAFT ENGINE

FIELD OF THE INVENTION

This invention relates to a method and apparatus for dynamically monitoring the condition of a mount system for an aircraft propulsion turbo-prop engine.

BACKGROUND OF THE INVENTION

In fail-safe mount systems for aircraft propulsion turbo-prop engines where progressive deterioration of one resilient element may be imperceptible, expensive and time consuming periodic inspections of the mount systems are required. A method and apparatus according to this invention dynamically monitors an engine mount system for an aircraft propulsion turbo-prop engine so that such periodic inspections are unnecessary.

SUMMARY OF THE INVENTION

This invention is a new and improved method and apparatus for monitoring a mount system for a aircraft propulsion turbo-prop engine. In the apparatus and method according to this invention, a first transducer dynamically monitors engine output shaft torque and a second transducer dynamically monitors an element of the mount system which reacts to the aircraft a fraction of the dynamic output shaft torque. A shaft torque signal from the first transducer and a comparison signal from the second transducer are transmitted to a divider in a monitoring circuit which provides a dynamic ratio of the signals which ratio represents the fraction of the dynamic shaft torque being reacted through the monitored one of the mount system elements. Deviation of the dynamic ratio signal from a reference ratio corresponding to normal operation of the mount system is an indication that a change in the load distribution between the elements of the mount system has occurred and that inspection of the mount system is in order. In a preferred embodiment of the apparatus and method according to this invention, the first transducer is a conventional torque meter of the type including a reference shaft around the output shaft of the engine and the second transducer includes a hydraulic cylinder in a link between the aircraft and a crankarm on a torque tube of the engine mount system.

BRIEF DESCRIPTION OF THE DRAWINGS

FIG. 1 is a side elevational view of a aircraft propulsion turbo-prop engine and reduction gearbox having a mount system dynamically monitored by an apparatus and method according to this invention;

FIG. 2 is a view taken generally along the plane indicated by lines 2—2 in FIG. 1;

FIG. 3 is a fragmentary view taken generally along the plane indicated by lines 3—3 in FIG. 1;

FIG. 4 is an enlarged, fragmentary sectional view taken generally along the plane indicated by lines 4—4 in FIG. 1;

FIG. 5 is an enlarged partially broken-away view of a portion of FIG. 1; and

FIG. 6 is schematic diagram of monitoring apparatus according to this invention.

DESCRIPTION OF THE PREFERRED EMBODIMENT

Referring to FIGS. 1 and 2, a representative aircraft propulsion turbo-prop engine 10 has a cylindrical case 12 including a compressor section 14, a combustor section 16, and a power turbine section 18. An axial flow compressor, not shown, in the compressor section 14 ingests air at a front end 20 of the engine and delivers compressed air to the combustor section 16. A fuel/air mixture is burned in the combustor section to generate motive fluid for power turbines, not shown, in the turbine section 18. The motive fluid is exhausted through a rear or aft end 22 of the engine.

The turbines drive a tubular output shaft 24, FIG. 4, aligned on a main axis 26 of the case and extending forward of the front end 20 of the engine. The output shaft is disposed in a stationary tube 28 rigidly connected at its aft end to the front end of the engine and at its front end to a reduction gearbox 30. The output shaft 24 has a splined front end 32, FIG. 4, which projects beyond a front end 33 of the tube 28 into the gearbox 30. The tube 28 has an expanded or enlarged torque meter housing portion 34 adjacent the gearbox 30.

The gearbox 30 is very rigid and houses a plurality of reduction gears, not shown, which transfer torque from the splined end 32 of the output shaft 24 to a propeller shaft 36 supported on the gearbox. A propeller assembly, not shown, is mounted on a flanged end 38 of the propeller shaft and rotated by the engine 10 in a direction indicated by the reference arrow in FIG. 2. A plurality of struts extend between the gearbox 30 and engine case 12, only a single strut 40 being shown in FIG. 1.

A mount system 42 supports the engine and gearbox on an aircraft, not shown, and includes a plurality of front resilient elements 44 between the gearbox and the aircraft. The connections defined by the elements 44 each have three spring rates for reacting thrust parallel to main axis 26 and vertical and lateral forces perpendicular to the main axis.

For reacting a major fraction, preferably about 70%, of the output shaft torque to the aircraft, the mount system 42 further includes a torque tube 46 aligned on a transverse axis 48. The torque tube 46 is rotatably supported in a pair of laterally spaced journals 50 connected to the gearbox 30 through a pair of rigid braces 52. Respective ones of a pair of 20 crankarms 54A-B are rigidly attached to the torque tube at opposite ends thereof and project generally horizontally toward the engine 10.

Respective ones of a pair of front vertical links 50A-B are adapted for attachment at their upper ends to the aircraft for pivotal movement about an axis 58, FIG. 2, parallel to transverse axis 48. The lower ends of the front vertical links 56A-B are adapted for pivotal attachment to respective ones of the crankarms 54A-B.

The mount system 42 further includes a pair of rear vertical links 60A-B having lower ends pivotally connected to respective ones of a pair of rigid brackets 62A-B on the combustor section 16 of the engine case through respective ones of a pair of schematically represented pivot pins 64A-B. The upper ends of the rear vertical links project through appropriate apertures, not shown, in a horizontal part 66, FIG. 3, of the aircraft and are connected to the horizontal part through respective ones of a pair of rear resilient supports 68A-B.

A transverse link 70 is pivotally attached at its opposite ends to respective ones of the rear vertical links 60A-B through a pair of pivot pins 72A-B. Mid-way between its ends, the transverse link is pivotally attached to a rigid bracket 74 on the combustor section 16 of the engine case by a pivot pin 76. The rear resilient supports 68A-B have two spring rates for resiliently reacting vertical and lateral forces to the aircraft.

Referring to FIGS. 4, 5 and 6, a first transducer 78 measures the torque transferred by the output shaft 24 of the engine 10 to the gearbox 30. The first transducer is a conventional torque meter and generally includes a tubular reference shaft 80 disposed around the output shaft 24 inside the rigid tube 28. An aft or rear end 82 of the reference shaft is splined connected to the output shaft. A forward or front end 84 of the reference shaft is expanded radially to define a plurality of circumferentially spaced pole pieces, not shown, within the torque meter housing 34 of the rigid tube 28.

The output shaft 24 has an annular flange 86 behind the splined end 32 thereof which is circumferentially interrupted to define a plurality of pole pieces, not shown, interposed with predetermined clearance between the pole pieces on the reference shaft. A magnetic pick-up 88 of the first transducer is mounted on the torque meter housing 34 close to the meshing pole pieces.

When the engine is off, the pole pieces on the reference shaft are centered between the pole pieces on the output shaft. When the engine is running, the output shaft twists in proportion to the amount of torque being transferred and moves the interposed pole pieces closer together in the direction of the torque. The magnetic pick-up 88 provides an electrical shaft torque signal representative of the spacing between the interposed pole pieces and, thus, representative of the dynamic or instantaneous magnitude of output shaft torque.

As seen best in FIGS. 1, 2 and 5, the front vertical links 56A defines a second transducer and includes a cylinder end 90 having an attaching eye 92 for pivotal connection to the crankarm 54A on the torque tube 46 and a rod guide 94 threaded into the cylinder end. A closed cylinder 96 is defined between the cylinder end and the rod guide. A piston 100 is slidably disposed in the closed cylinder and attached to a rod 102 slidably supported in the rod guide 94. The rod 102 has an attaching eye 104 at the top for pivotal connection to the aircraft. The closed cylinder 96 is filled with hydraulic oil. A pressure pick-up 106 on the cylinder end 90 communicates with the closed cylinder 96 through a passage 108 and provides an electrical signal representative of the pressure in the closed cylinder.

When the engine is off, the front vertical links 56A-B are effectively unloaded and there is no fluid pressure in the closed cylinder 96. When the engine rotates the propeller shaft 36 in the direction indicated by the reference arrow in FIG. 2, the vertical link 56A reacts a fraction of the output shaft torque in compression to the aircraft and the opposite side front vertical link 56B reacts the same fraction in tension. Accordingly, the fluid in the closed cylinder 96 is placed in compression by the piston 100 and the pressure in the closed cylinder, as represented by the signal from the pressure pick-up 106 of the second transducer, is a dynamic measure of the fraction of the output shaft torque being reacted to the aircraft by the front vertical link 56A.

Referring to FIG. 6, a schematically illustrated monitoring circuit 110 includes a divider 112 connected to the first and second transducers, a recording device 114 and, optionally, a continuous read-out instrument 116 each connected to the divider. The ratio signal from the divider represents the fraction of output shaft torque being reacted through the front vertical link 56A and is applied to the recording device 114 to produce a permanent record of the dynamic ratio during the duration of engine operation. In addition, the divider signal may be applied to the instrument 116 to provide an on-board indication of the dynamic ratio.

The dynamic ratio signal from the divider 112 is an indication of the, condition of the mount system 42. When all the elements of the mount system are in proper condition and operating normally, the dynamic ratio has a predetermined or reference magnitude corresponding to a predetermined fraction of engine output shaft torque being reacted through the front vertical link 56A. If one of the elements of the mount system 42 deteriorates or otherwise malfunctions, the fraction of the output shaft torque reacted through the front vertical link 56A changes. Accordingly, the dynamic ratio signal from the divider 112 likewise changes. Deviation of the magnitude of the dynamic ratio signal from the divider 112 beyond a predetermined limit from the aforesaid reference magnitude, as shown on the recording device 114 or the instrument 116, alerts the aircraft operator that the mount system should be visually or otherwise inspected.

The embodiments of the invention in which an exclusive property or privilege is claimed are defined as follows:

1. A method, of monitoring the condition of a mount system between an airframe of an aircraft and a propulsion engine having a case and an output shaft rotatably supported on said case,
    said mount system including a plurality of mount elements between said case and said airframe of said aircraft each reacting a predetermined fraction of the dynamic torque transferred by said output shaft in a normal operating condition of said mount system,
    said method comprising the steps of:
    dynamically measuring the fraction of said output shaft torque being reacted by a selected one of said mount elements, and
    comparing said dynamically measured fraction with said predetermined fraction for said selected one of said mount elements thereby to identify changes in load distribution between each of said mount elements.

2. The method recited in claim 1 wherein the step of dynamically measuring the fraction of said output shaft torque being reacted by a selected one of said mount elements includes the steps of
    providing a first transducer on said engine generating a first signal corresponding to the dynamic magnitude of the torque transferred by said output shaft,
    providing a second transducer on said selected one of said mount elements generating a second signal corresponding to the dynamic magnitude of the force transferred by said mount element between said case and said aircraft, and said airframe and
    dividing said second signal by said first signal to produce a third signal representative of the dynamic fraction of output shaft torque being reacted by said selected one of said mount elements.

3. The method recited in claim 2 wherein said engine is a gas turbine engine, and said shaft rotatably supported on said case is connected to an aircraft propulsion propeller.

4. The method recited in claim 3 wherein said second transducer includes means on said selected mount element defining a cylinder end connected to one of said engine case and said airframe of said aircraft, means on said selected mount element defining a piston connected to the other of said engine case and said aircraft and cooperating with said airframe of said cylinder end in defining therein a closed cylinder, a volume of incompressible fluid in said closed cylinder, and a pressure pick-up connected to said closed cylinder for measuring the fluid pressure therein.

* * * * *